United States Patent
Krapf et al.

(10) Patent No.: US 9,513,140 B2
(45) Date of Patent: Dec. 6, 2016

(54) HANDHELD MEASURING DEVICE

(75) Inventors: Reiner Krapf, Filderstadt (DE); Heiko Sgarz, Leonberg (DE); Michael Mahler, Leinfelden-Echterdingen (DE); Christoph Wuersch, Werdenberg (CH); Wilfried Kaneider, Rankweil-Brederis (AT)

(73) Assignee: Robert Bosch GmbH, Stuttgart (DE)

( * ) Notice: Subject to any disclaimer, the term of this patent is extended or adjusted under 35 U.S.C. 154(b) by 831 days.

(21) Appl. No.: 13/516,662

(22) PCT Filed: Oct. 26, 2010

(86) PCT No.: PCT/EP2010/066101
§ 371 (c)(1),
(2), (4) Date: Sep. 26, 2012

(87) PCT Pub. No.: WO2011/072929
PCT Pub. Date: Jun. 23, 2011

(65) Prior Publication Data
US 2013/0179123 A1   Jul. 11, 2013

(30) Foreign Application Priority Data
Dec. 18, 2009  (DE) .................. 10 2009 054 950

(51) Int. Cl.
*G01D 3/08* (2006.01)
*G01V 3/15* (2006.01)

(52) U.S. Cl.
CPC .. *G01D 3/08* (2013.01); *G01V 3/15* (2013.01)

(58) Field of Classification Search
CPC ........................................ G01D 3/08
USPC ........................................ 702/187
See application file for complete search history.

(56) References Cited

U.S. PATENT DOCUMENTS

| 7,532,127 B2* | 5/2009 | Holman et al. ............ 340/686.1 |
| 2004/0095151 A1* | 5/2004 | Schmidt et al. ............... 324/686 |
| 2004/0201370 A1* | 10/2004 | Clauss et al. .................... 324/67 |
| 2004/0239305 A1* | 12/2004 | Clauss et al. .................... 324/67 |
| 2005/0040817 A1* | 2/2005 | Clauss et al. .................. 324/239 |
| 2007/0188158 A1* | 8/2007 | Skultety-Betz ................. 324/67 |
| 2007/0296955 A1* | 12/2007 | Skultety-Betz et al. ........ 356/51 |

(Continued)

FOREIGN PATENT DOCUMENTS

| CN | 1954240 A | 4/2007 |
| DE | 10 2006 025 881 A1 | 12/2007 |

(Continued)

OTHER PUBLICATIONS

International Search Report corresponding to PCT Application No. PCT/EP2010/066101, mailed Apr. 6, 2011 (German and English language document) (7 pages).

*Primary Examiner* — Manuel L Barbee
*Assistant Examiner* — Raymond Nimox
(74) *Attorney, Agent, or Firm* — Maginot, Moore & Beck LLP

(57) ABSTRACT

A handheld measuring device includes at least one locating sensor provided for locating at least one object in a measured object, and has a protective circuit that comprises at least one object sensor provided for registering at least one object parameter which at least depends on an alignment of the locating sensor to the measured object. The protective circuit has at least one operator sensor provided for registering at least one operator parameter dependent on an operator.

10 Claims, 3 Drawing Sheets

(56) References Cited

U.S. PATENT DOCUMENTS

2008/0129276 A1* 6/2008 Skultety-Betz et al. ... 324/76.11
2008/0148803 A1* 6/2008 Skultety-Betz et al. ....... 73/1.01

FOREIGN PATENT DOCUMENTS

| EP | 1 760 493 A2 | 3/2007 |
|----|---|---|
| JP | 62-203488 U | 12/1987 |
| JP | 2005-518549 A | 6/2005 |
| JP | 2006-527842 A | 12/2006 |
| JP | 2006-528777 A | 12/2006 |
| JP | 2009-500742 A | 1/2009 |
| WO | 03/073131 A1 | 9/2003 |
| WO | 2005/111663 A1 | 11/2005 |

* cited by examiner

HANDHELD MEASURING DEVICE

This application is a 35 U.S.C. §371 National Stage Application of PCT/EP2010/066101, filed on Oct. 26, 2010, which claims the benefit of priority to Serial No. DE 10 2009 054 950.1, filed on Dec. 18, 2009 in Germany, the disclosures of which are incorporated herein by reference in their entirety.

BACKGROUND

The disclosure relates to a handheld measuring device.

A handheld measuring device having a locating sensor, which is intended to locate an item in a measurement object, and having a protective circuit, which has an object sensor which is intended to record an object parameter which is dependent on an orientation of the locating sensor with respect to the measurement object, has already been proposed. The object sensor of the protective circuit is used to detect when the handheld measuring device rests on a measurement object.

SUMMARY

The disclosure relates to a handheld measuring device having at least one locating sensor, which is intended to locate at least one item in a measurement object, and having a protective circuit, which has at least one object sensor which is intended to record at least one object parameter which is dependent at least on an orientation of the locating sensor with respect to the measurement object.

It is proposed that the protective circuit has at least one operator sensor which is intended to record at least one operator parameter dependent on an operator. A "handheld measuring device" is supposed to be understood as meaning, in particular, a device which is intended to carry out at least one measurement in a manner held and/or guided by an operator.

The handheld measuring device advantageously displays a measurement result on a display which is concomitantly moved. In particular, the term "locating sensor" is supposed to be understood as meaning a capacitive sensor, an inductive sensor, a radar sensor, an X-ray sensor, another sensor which appears to be useful to a person skilled in the art and/or advantageously a UWB sensor. A "UWB sensor" is supposed to be understood as meaning, in particular, a sensor which emits at least one broadband radio signal during a measurement and receives a reflection of the radio signal. In this case, the abbreviation "UWB" stands for "ultra wide band". A "broadband radio signal" is supposed to be understood as meaning, in particular, a radio signal having a 3 dB bandwidth of more than 0.3 GHz, advantageously more than 1 GHz. The radio signal preferably has a center frequency—which appears to be useful to a person skilled in the art—of between 180 MHz and 10.5 GHz, particularly preferably between 600 MHz and 3 GHz. A transmission power of the locating sensor is advantageously less than 0.5 mW and/or less than −41.3 dBm/MHz, particularly advantageously less than −63 dBm/MHz. In particular, the phrase "locate an item in a measurement object" is supposed to be understood as meaning that the locating sensor can detect an item arranged in a concealed manner in the measurement object during operation. The locating sensor advantageously detects a distance between an item arranged in a concealed manner and the locating sensor during operation, in particular if the item is arranged in a locating range of the locating sensor. The locating sensor is preferably intended to locate an item in a wall, a ceiling and/or in a floor. An item could be, for example, a reinforcement, a plastic pipe, an electric cable and/or other objects which, in particular, form the wall such as concrete, bricks, masonry etc. A "protective circuit" is supposed to be understood as meaning, in particular, a circuit which prevents transmission of a radio signal in at least one operating state, to be precise, in particular, in order to protect third-party devices, for example GPS, W-LAN, UMTS, aviation radio and/or radio astronomy, from interference caused by the radio signal. In particular, an "object sensor" is supposed to be understood as meaning a UWB sensor, an impedance-measuring sensor, an optical sensor, an identification sensor, an inductive sensor, a sound sensor, a tactile sensor, another sensor which appears to be useful to a person skilled in the art and/or advantageously a capacitive sensor. A "UWB sensor" advantageously measures a distance between a surface of a measurement object and the object sensor by means of a broadband radio signal reflected from the surface of the measurement object. An "impedance-measuring sensor" preferably measures a characteristic impedance of an antenna, a mismatch of the antenna, a step response and/or an impulse response of the antenna and/or another parameter of the antenna which appears to be useful to a person skilled in the art. The impedance-measuring sensor advantageously measures the impedance of an antenna of the locating sensor. An "optical sensor" is supposed to be understood as meaning, in particular, a reflected light barrier, a photorefractor and/or another optical sensor which appears to be useful to a person skilled in the art. An "identification sensor" is supposed to be understood as meaning, in particular, a sensor which detects a mark applied to or on the measurement object, for example a barcode or an RFID chip, in at least one operating state. A "sound sensor" is supposed to be understood as meaning, in particular, an ultrasound sensor or another sensor which appears to be useful to a person skilled in the art. A "capacitive sensor" is supposed to be understood as meaning, in particular, a sensor which measures a capacitance which is dependent at least on an orientation of the locating sensor with respect to the measurement object and, in particular, on a distance between the locating sensor and the measurement object. "Intended" is supposed to be understood as meaning, in particular, specially equipped, designed and/or programmed. An "object parameter" is supposed to be understood as meaning, in particular, a parameter which, coded in analog and/or digital form, provides and/or transports an item of information relating to the orientation of the locating sensor relative to the measurement object. It is advantageously possible to at least infer from the information whether the locating sensor is oriented with respect to the measurement object. An "operator sensor" is supposed to be understood as meaning, in particular, a tactile sensor, a resistive sensor, a motion sensor, an acceleration sensor, an RFID sensor, an infrared sensor, another sensor which appears to be useful to a person skilled in the art and/or advantageously a capacitive sensor. A "tactile sensor" could be, for example, in the form of a switch which can be operated by an operator and is arranged on a handle and/or at least one axle of at least one wheel. A "motion sensor" could detect, for example, a movement of the handheld measuring device with respect to the measurement object by means of incremental encoders arranged on axles of the suspension. An "RFID sensor" could detect, for example, the presence of an RFID chip carried along by an operator. This sensor could simultaneously be used for theft protection. In particular, an "operator parameter" is supposed to be understood as meaning a parameter which, coded in analog and/or digital form, provides and/or transports an item of information relating to interaction between the operator and the handheld measuring device. The operator parameter preferably describes whether the operator grips the hand tool, accelerates it, attaches it to a measurement object and/or moves it. The inventive configuration of the handheld measuring device makes it possible to detect an operating state ready for measurement in a particularly advantageous and reliable manner with particularly few components and a small amount of design complexity. As a result, the locating sensor can be switched off, in particular, in other operating states, which avoids electromagnetic interference.

Another refinement proposes that the protective circuit has at least one evaluation unit which outputs a control parameter dependent at least on the object parameter and the operator parameter in at least one operating state. An "evaluation unit" is supposed to be understood as meaning, in particular, a unit which has an input for the object parameter, an input for the operator parameter and an output for a control parameter. Alternatively, the evaluation unit could also have a single input for the object parameter and the operator parameter. Alternatively or additionally, the evaluation unit could logically combine, in particular, the operator parameter and the object parameter. A "control parameter" is supposed to be understood as meaning, in particular, a parameter which is intended to influence, in particular, a power of a radio signal of the locating sensor and, in particular, to switch off a radio signal. The evaluation unit makes it possible to detect an operating state ready for measurement in a particularly reliable manner and in a simple manner in terms of design.

It is also proposed that the object sensor is intended to determine the object parameter on the basis of a distance between the locating sensor and the measurement object, as a result of which it is possible to detect, in a particularly reliable manner, when the measuring device is arranged in a position ready for measurement relative to the measurement object. The phrase "on the basis of a distance" is supposed to be understood as meaning, in particular, that the object parameter has at least one item of information which describes the distance. It is advantageously possible to determine, from the information, whether wheels of the handheld measuring device rest against the measurement object.

It is also proposed that the locating sensor emits a broadband radio signal in at least one operating state, as a result of which particularly advantageous and accurate locating can be achieved in a simple manner in terms of design.

It is also proposed that the protective circuit influences emission of the broadband radio signal in at least one operating state, as a result of which advantageously the radio signal can be reduced and/or advantageously switched off in operating states in which a measurement is not intended to be carried out. In particular, the phrase "influence emission" is supposed to be understood as meaning that the protective circuit changes and/or advantageously switches on and/or switches off the broadband radio signal, in particular a transmission power of the radio signal. Alternatively, emission could be suppressed only in interfering frequency ranges.

It is also proposed that the locating sensor and the object sensor are at least partially integral, as a result of which components and outlay in terms of design can be saved in a particularly advantageous manner. The term "at least partially integral" is supposed to be understood as meaning, in particular, that the locating sensor and the object sensor have at least one common functional group which advantageously converts a measurement variable into an electrical parameter, in particular. The locating sensor and the object sensor preferably have a common measuring sensor. The object sensor and the locating sensor advantageously record at least one parameter according to an identical functional principle, for example by UWB signal, or alternatively according to a different functional principle, for example by UWB signal and capacitive signal.

One advantageous embodiment of the disclosure proposes that the object sensor and/or the operator sensor is/are intended to measure capacitively, as a result of which a particularly reliable and robust measurement is possible in a simple manner in terms of design. The phrase "measure capacitively" is supposed to be understood as meaning, in particular, that the object sensor and/or the operator sensor measure(s) at least one capacitance. The object sensor preferably measures at least one capacitance between a measuring sensor of the object sensor and the measurement object. The operator sensor advantageously measures a capacitance between a measuring sensor of the operator sensor and the operator.

It is also proposed that the object sensor and the operator sensor have an at least partially integral measuring means, thus advantageously making it possible to save components and installation space. A "measuring means" is supposed to be understood as meaning, in particular, a means which converts energy, which comes, in particular, from a measuring sensor, into a parameter, that is to say interprets and/or linearizes it, in particular. One or two measuring means preferably output the object parameter and/or the operator parameter.

It is also proposed that the object sensor and the operator sensor are at least partially connected in series, thus making it possible to combine the parameters of the sensors in a simple manner in terms of design and in a manner which is particularly economical in terms of components. The measuring sensors of the object sensor and of the operator sensor are preferably connected in series, advantageously via the measurement object and the operator. The phrase "connected in series" is supposed to be understood as meaning, in particular, that the energy used for measurement passes through the measuring sensors in succession. A "measuring sensor" is supposed to be understood as meaning, in particular, a means which emits and/or advantageously receives energy used for measurement and, in particular, converts it in the process.

It is also proposed that the operator sensor is intended to detect at least one acceleration, as a result of which interaction between the operator and the handheld measuring device can be detected in a particularly advantageous manner. An "acceleration" is supposed to be understood as meaning, in particular, an acceleration of the measuring means of the operator sensor relative to the measurement object. Alternatively or additionally, the operator sensor determines a speed of the measuring means of the operator sensor relative to the measurement object, in particular by means of integration.

It is also proposed that the operator sensor is intended to detect at least one rotational speed ("gyro"), as a result of which interaction between the operator and the handheld measuring device can be detected in a particularly advantageous manner. This makes it possible, in particular, to detect when the detector is lifted off a wall, for example.

BRIEF DESCRIPTION OF THE DRAWINGS

Further advantages emerge from the following description of the drawing. The drawing illustrates an exemplary embodiment of the disclosure. The drawing, the description and the claims contain numerous features in combination. A person skilled in the art will expediently also consider the features individually and will combine them to form useful further combinations.

In the drawing.

DETAILED DESCRIPTION

Figure 1:
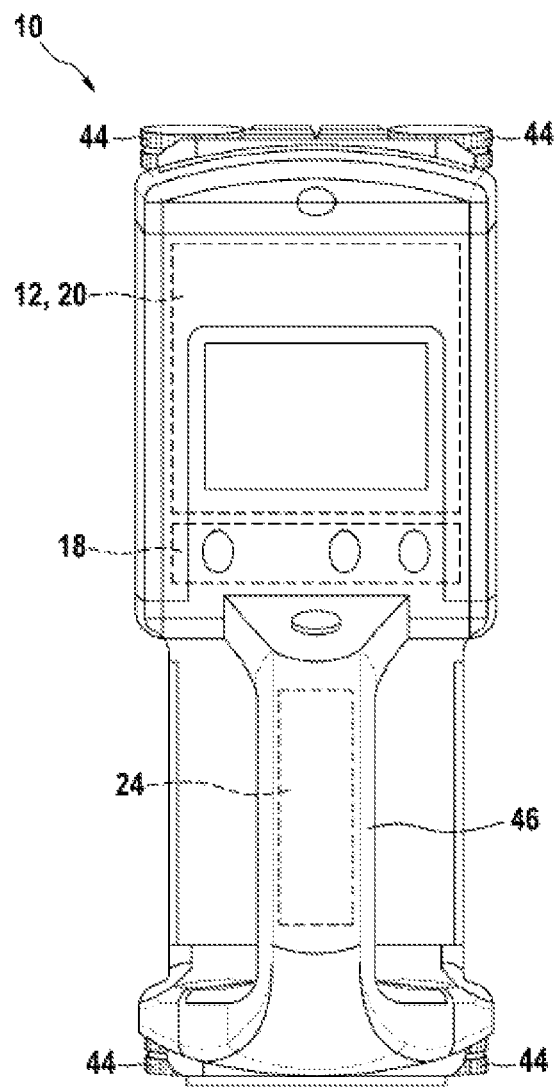
FIG. 1 shows a handheld measuring device according to the disclosure having a locating sensor and a protective circuit which has an object sensor and an operator sensor.

FIG. 1 shows a handheld measuring device 10 according to the disclosure having a locating sensor 12. The locating sensor 12 locates items 14 which are arranged in a measurement object 16 during measurement operation. The measurement object 16 is in the form of a wall. In this case, the items 14 may be arranged in a concealed manner below a surface of the measurement object 16. For locating purposes, the locating sensor 12 has a measuring sensor 40 and locating electronics 42. During measurement operation, the locating sensor 12 emits a broadband radio signal 36. A bandwidth of the radio signal 36 is 1 to 3 GHz. The measuring sensor 40 has a plurality of antennas (not individually illustrated). The locating electronics 42 and the measuring sensor 40 together form an SAR (Synthetic Aperture Radar) locating system. The radio signal 36 is reflected by the items 14. Propagation times and strength of the reflections are measured by the locating sensor 12. A depth resolution of the broadband radio signal 36 can be calculated according to the following formula in this case:

$$\Delta z = \frac{c_0}{2\sqrt{\varepsilon_r}\, B}$$

$\Delta z$: Depth resolution in [m]
$c_0$: Speed of light in [m/s]
$\varepsilon_r$: Permittivity of the measurement object
B: Bandwidth of the radio signal During measurement operation, an operator 28 moves the handheld measuring device 10 along a surface of the measurement object 16. For this purpose, the handheld measuring device 10 has a chassis having a plurality of wheels 44. The chassis has axles (not illustrated in any more detail) which rotatably fasten the wheels 44. The axles are connected to motion sensors (not illustrated in any more detail) which detect a movement of the handheld measuring device 10 relative to the measurement object 16. As a result, a computation unit (not illustrated in any more detail) of the handheld measuring device 10 can calculate a two-dimensional section of the measurement object 16. The computation unit is in the form of a microcontroller.

Figure 2:
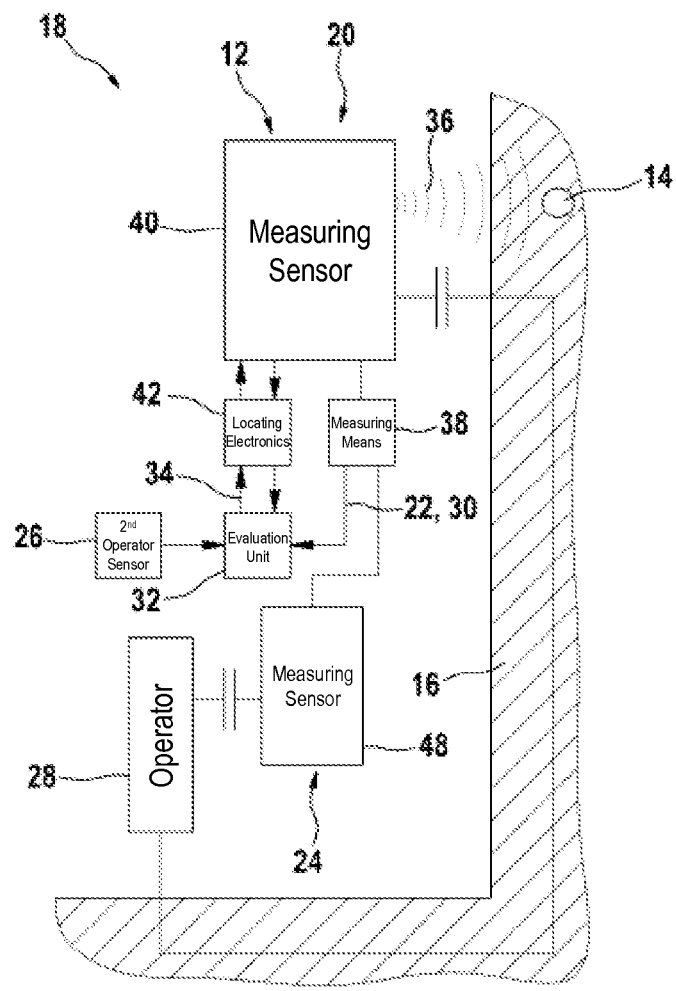
FIG. 2 shows a schematic structure of the protective circuit of the handheld measuring device from FIG. 1.

FIG. 2 shows that the handheld measuring device 10 has a protective circuit 18 having an object sensor 20. During operation, the object sensor 20 records an object parameter 22. The object parameter 22 is dependent on an orientation of the locating sensor 12 with respect to the measurement object 16, that is to say the object parameter 22 has at least one item of information which describes whether the locating sensor 12 is oriented with respect to the measurement object 16. For this purpose, the object sensor 20 has a measuring means 38 and a measuring sensor 40. The measuring sensor 40 of the locating sensor 12 is integral with the measuring sensor 40 of the object sensor 20. The locating sensor 12 and the object sensor are thus partially integral. Alternatively, a measuring sensor of the locating sensor 12 could be separate from the measuring sensor 40 of the object sensor 20 and could be connected, in particular capacitively, to the measurement object 16, for example via the wheels 44 or via a sliding contact.

The object sensor 20 is in the form of a capacitive sensor, that is to say the measuring means 38 is intended to measure a capacitance between two inputs. The object sensor 20 thus measures the object parameter 22 capacitively. The measuring means 38 is capacitively coupled to the measurement object 16 via the measuring sensor 40. As a result, the object sensor 20 can determine the object parameter 22 on the basis of a distance between the locating sensor 12 and the measurement object 16. Alternatively or additionally, an object sensor could be in the form of a motion sensor connected to the wheels 44 or in the form of a sensor which detects a pressure of the wheels 44 against the surface during operation.

The protective circuit 18 also has a first operator sensor 24 and a second operator sensor 26. The operator sensors 24, 26 record an operator parameter 30 dependent on the operator 28 during measurement operation. The operator parameter 30 has information describing interaction of the operator 28, from which a measuring intention is recognizable, that is to say whether the operator 28 wishes to carry out a measurement. For example, the operator parameter 30 could describe whether the handheld measuring device 10 is accelerated, whether the operator 28 is in the vicinity of the handheld measuring device 10 and/or whether the operator 28 grips a handle 46 of the handheld measuring device 10.

In this exemplary embodiment, the first operator sensor 24 has a measuring means 38 and a measuring sensor 48. The measuring means 38 of the operator sensor 24 is integral with the measuring means 38 of the object sensor 20. The measuring sensor 48 is in the form of an electrode. Furthermore, the measuring sensor 48 is arranged in the handle 46 of the handheld measuring device 10. The measuring means 38 is capacitively coupled to the operator 28 via the measuring sensor 48. The operator sensor 24 measures the operator parameter 30 capacitively.

Figure 3:
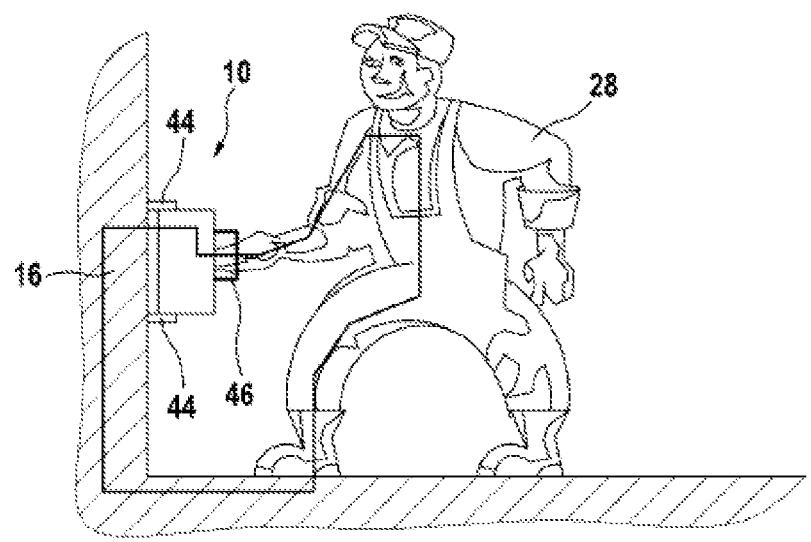
FIG. 3 shows a schematic functional diagram of the protective circuit of the handheld measuring device from FIG. 1.

FIGS. 2 and 3 show that the measuring sensors 40, 48 of the object sensor 20 and of the operator sensor 24 are connected in series. A port of the measuring sensors 40, 48 is respectively connected to one of the inputs of the measuring means 38. The other ports of the measuring sensors 40, 48 are capacitively coupled to one another via the measurement object 16 and the operator 28. The series circuit is closed when the operator 28 has gripped the handle 46 and when the handheld measuring device 10 is placed against the measurement object 16, as intended. The operator 28 is coupled to the measurement object 16 via his feet or another body part.

The protective circuit 18 has an evaluation unit 32 which is partially integral with the computation unit.

The evaluation unit 32 comprises a computation routine. The computation routine is executed on a processor of the computation unit. The evaluation unit 32 also comprises an input for a signal having the object parameter 22 and the operator parameter 30. The evaluation unit 32 also comprises an output for a control parameter 34.

Figure 4:
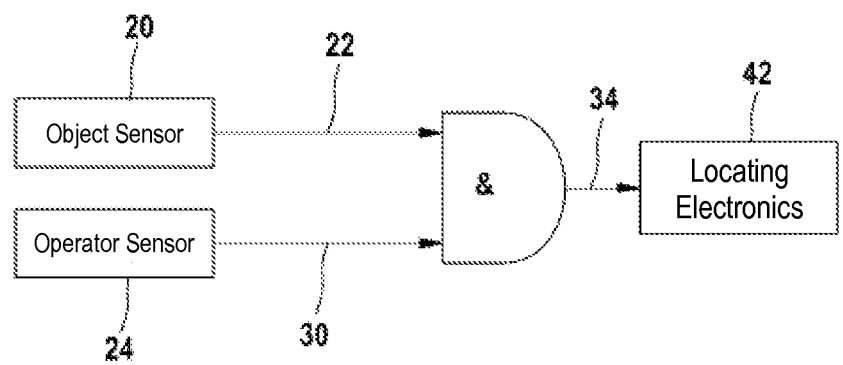
FIG. 4 shows a method of operation of an evaluation operation in the handheld measuring device from FIG. 1.

During operation, the evaluation unit 32 outputs the control parameter 34 on the basis of the object parameter 22 and the operator parameter 30. The control parameter 34 is an input signal of the locating electronics 42. If the series circuit is open, the protective circuit 18 interrupts emission of the broadband radio signal 36 via the locating electronics 42. The series circuit thus ANDs the object parameter and the operator parameter 30 (FIG. 4). This ensures that the broadband radio signal 36 is only transmitted into the measurement object and only when it is required for measurement.

During operation, the second operator sensor 26 detects an acceleration of the handheld measuring device 10. The measured acceleration is evaluated, that is to say weighted, filtered and aimed in a direction in which the handheld measuring device 10 is moved during a measurement. If the evaluated acceleration exceeds a threshold value, the evaluation unit 32 assumes a measuring movement caused by the operator and switches on the broadband radio signal 36 via the locating electronics 42. In this case, the evaluation unit 32 ANDs an operator parameter of the second operator sensor 26 and the object parameter 22.

The invention claimed is:

1. A handheld measuring device, comprising:
   at least one locating sensor configured to locate at least one item in a measurement object, the at least one locating sensor being configured to (i) in a first operating state, emit an electromagnetic field to locate the at least one item in the measurement object, and (ii) in a second operating state, cease emitting the electromagnetic field; and
   a protective circuit configured to control whether the at least one locating sensor is in the first operating state based on an object parameter and an operator parameter, the protective circuit comprising:
      at least one object sensor configured to measure the object parameter, the object parameter indicating a distance between the at least one locating sensor and the measurement object; and
      at least one operator sensor configured to measure the operator parameter, the operator parameter indicating whether the handheld measuring device is currently being held by the operator,
   wherein the protective circuit is configured to (i) cause the at least one locating sensor to change from the first operating state to the second operating state in response to the operator parameter indicating that the handheld measuring device is no longer being held by the operator, and (ii) cause the at least one locating sensor to change from the first operating state to the second operating state in response to the object parameter indicating that the distance between the at least one locating sensor and the measurement object exceeds a predetermined distance.

2. The handheld measuring device as claimed in claim 1, the protective circuit further comprising:
   at least one evaluation unit configured to output a control parameter based on the object parameter and the operator parameter.

3. The handheld measuring device as claimed in claim 1, wherein the object parameter is a distance between the at least one locating sensor and the measurement object.

4. The handheld measuring device as claimed in claim 1, wherein the locating sensor and the object sensor are at least partially integral.

5. The handheld measuring device as claimed in claim 1, wherein at least one of the object sensor and the operator sensor is configured to measure a capacitance.

6. The handheld measuring device as claimed in claim 1, wherein the object sensor and the operator sensor have an at least partially integral measuring mechanism.

7. The handheld measuring device as claimed in claim 1, wherein the object sensor and the operator sensor are at least partially connected in series.

8. The handheld measuring device as claimed in claim 1, wherein the operator parameter is an acceleration of the handheld measuring device.

9. The handheld measuring device as claimed in claim 1, wherein the operator parameter is a speed of the handheld measuring device.

10. The handheld measuring device as claimed in claim 9, wherein the operator parameter is an operating speed of the handheld measuring device.

* * * * *